Aug. 30, 1932.  L. FABIAN  1,874,944

BATTERY TOOL

Filed April 2, 1931

Inventor

Louis Fabian

By Owen & Owen

Attorneys

Patented Aug. 30, 1932

1,874,944

UNITED STATES PATENT OFFICE

LOUIS FABIAN, OF TOLEDO, OHIO

BATTERY TOOL

Application filed April 2, 1931. Serial No. 527,151.

This invention relates to tools, but more particularly to tools adapted to remove clamping nuts from battery terminals, the metal of which frequently becomes so corroded by the acid from the battery that it is practically impossible to unscrew them by the ordinary wrench or pliers.

An object of this invention is to produce a simple and efficient tool which can be used satisfactorily to remove nuts or bolts which have been corroded, or which are impossible as a practical matter to remove with the ordinary tool.

Another object is to produce a tool having gripping jaws provided with teeth which, when gripping force is exerted, tend to cam or urge the tool in one direction laterally of the work.

Further objects and advantages will hereinafter appear, and, for purposes of illustration, but not of limitation, an embodiment of the invention is shown in the accompanying drawing, in which.

Figure 1:
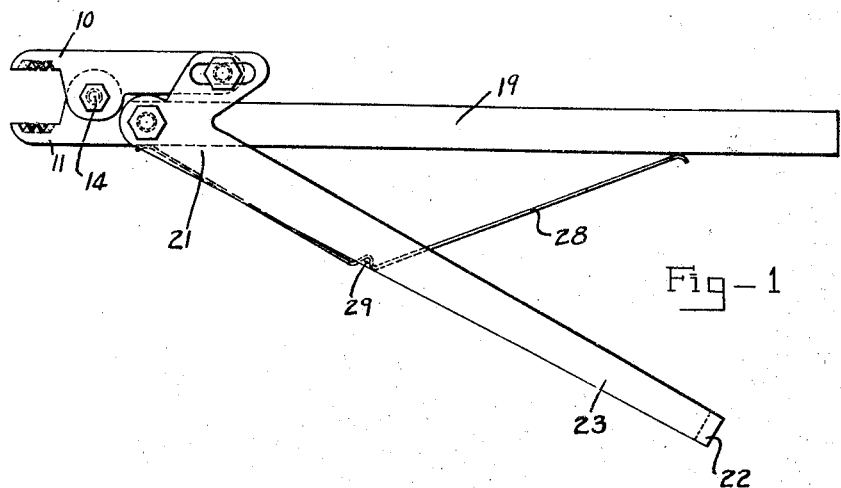
Figure 1 is a side elevation of the tool.

The illustrated embodiment of the invention comprises a tool having gripping jaws 10 and 11. Extending from the jaw 10 is a pair of depending flanges 12 between which projects an ear 13 extending from the jaw 11. A pin 14 provides a pivot for the jaws and extends through the flanges 12 and ear 13.

Figure 4:
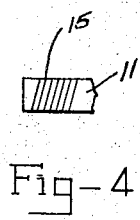
Figure 4 is a view on the line 4—4 of Fig. 2 showing the gripping teeth in one of the jaws.
Figure 3:
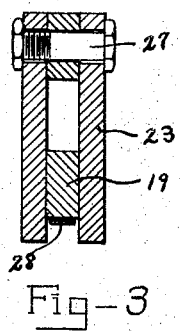
Figure 3 is a vertical sectional elevation on the line 3—3 of Fig. 2.
Figure 5:
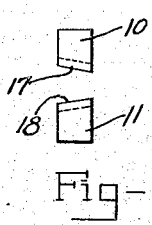
Figure 5 is an end view of the jaws substantially as indicated by the line 5—5 in Fig. 2.

An important feature of the invention resides in the form of the teeth formed on the gripping surfaces of the jaws 10 and 11. As shown in Fig. 4, teeth 15 on the jaw 11 are inclined at approximately an angle of 45°. This angle may be computed from a line extending between the jaws and disposed parallel to the axis of the pin 14. The teeth 16 on the jaw 10 are inclined in the opposite direction from the teeth 15 on the jaw 11, but the angle of inclination is substantially the same as that of the teeth 15. As shown in Fig. 5, the jaws 10 and 11 are provided with oppositely inclined surfaces 17 and 18. It will thus be seen that when the tool is applied to a nut the sides of which are so corroded that they are no longer parallel, a biting action of the jaws is had by their divergent relationship.

Figure 2:
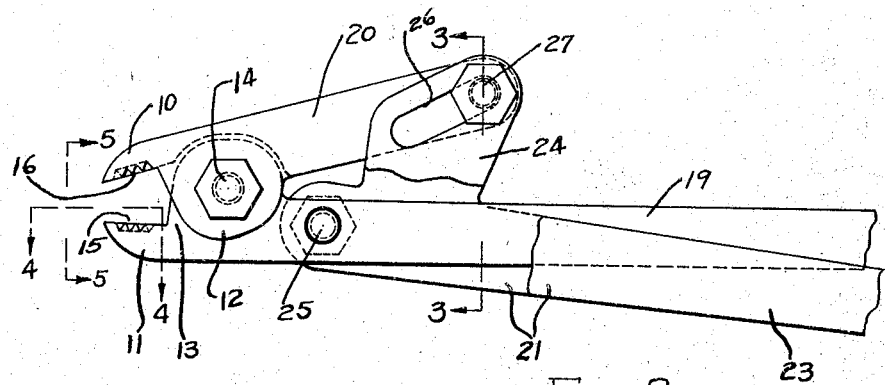
Figure 2 is an enlarged fragmentary elevation of the tool shown in Fig. 1 with the clamping jaws moved toward each other.

By virtue of the above construction, when the tool is applied to a nut or bolt head with the parts positioned as shown in Figs. 1 and 2, there is a tendency for the teeth to cam the tool sidewise in one direction at the time the jaws are clamped and a turning movement imparted to the tool. This is of considerable value when the tool is applied to a nut or bolt head which has become so corroded as to render useless as a practical matter the ordinary wrench or pliers.

The tool should be applied to such a nut or bolt head so that it tends to move laterally in the direction of a substantially rigid abutment. Thus, it will be apparent that when the jaws 10 and 11 are forced toward each other into clamping relation a secure and satisfactory grip may be obtained on the nut or bolt head to which the tool is applied, thereby enabling the nut or bolt to be screwed or unscrewed in a simple and convenient manner. The tool thereby performs a function which the ordinary tool of this character could not perform since the ridges, corrugations, or teeth on the gripping surfaces of the ordinary tool are substantially parallel to each other, and therefore it would slip around the nut or bolt head, so that in order to remove the element it will be necessary to break it off by chiseling, or some other means.

The jaw 11 is provided with a relatively long handle arm 19, and the jaw 10 is provided with a relatively short arm 20. A pair of bell cranks 21, which may be integrally connected at their outer ends at 22, is provided with long handle arms 23 and relatively short arms 24 extending at angles of approximately 45° to the handle arms 23. The bell cranks 21 straddle the handle arm 19, and are pivoted substantially at their apex at 25 to the handle arm 19 adjacent the pivot 14 of the clamping jaws. The short arms 24 of the bell crank are provided with registering elongate slots 26 in which a pin 27 secured to the short arm 20 of the jaw 10 has relative movement. It will be understood that the short arms 24 of the bell crank straddle the jaw extension 20.

For normally holding the handle arms 19 and 21 in separated relation a leaf spring 28 bears at one end against the arm 19, and is bent over a pin 29, which connects the arms 21, the opposite end of the spring engaging the handle arm 19 in the region of the pivot 14.

Owing to the above described construction, it will be apparent that slight movement of the gripping jaws 10 and 11 will be effected by much greater movement of the handle arms 19 and 23. This enables the tool to be readily and conveniently oscillated for unscrewing or screwing nuts and bolts in relatively inaccessible positions. It will also be apparent that due to the arrangement of the bell cranks 21 a great amount of force can be secured at the clamping jaws 10 and 11 without any great amount of exertion on the part of the operator. The tool is sturdy, rigid, and may be manufactured at a relatively low cost. It will also be noted that the tool may be conveniently assembled in a minimum period of time.

It is to be understood that the above description is given merely by way of illustration and not of limitation, and, although the tool has been described as particularly useful for battery purposes, the scope of the invention is much broader, and it is intended that this invention be defined by the appended claims.

What I claim is:

1. A tool of the class described comprising a pair of pivotally connected jaws, said jaws having opposed gripping faces divergent from one side edge to the opposite side edge, and gripping teeth on said jaws inclined in opposite directions at an angle substantially 45° to a line parallel to the axis of said jaws.

2. A tool of the class described comprising a pair of pivotally connected jaws, said jaws having opposed gripping faces divergent from one side edge to the opposite side edge, and gripping teeth on said jaws inclined in opposite directions.

In testimony whereof I have hereunto signed my name to this specification.

LOUIS FABIAN.